(12) United States Patent
Stirling-Gallacher et al.

(10) Patent No.: US 8,797,208 B2
(45) Date of Patent: Aug. 5, 2014

(54) ACTIVE RADAR SYSTEM AND METHOD

(75) Inventors: Richard Stirling-Gallacher, Stuttgart (DE); Qi Wang, Esslingen (DE)

(73) Assignee: Sony Corporation, Tokyo (JP)

(*) Notice: Subject to any disclaimer, the term of this patent is extended or adjusted under 35 U.S.C. 154(b) by 337 days.

(21) Appl. No.: 13/303,549

(22) Filed: Nov. 23, 2011

(65) Prior Publication Data

US 2012/0146844 A1 Jun. 14, 2012

(30) Foreign Application Priority Data

Dec. 13, 2010 (EP) .................................. 10194746

(51) Int. Cl.
*G01S 13/89* (2006.01)
*G01S 13/34* (2006.01)

(52) U.S. Cl.
CPC .................................... *G01S 13/343* (2013.01)
USPC ............................................ 342/179; 342/22

(58) Field of Classification Search
CPC ..... G01S 13/04; G01S 13/343; G01S 7/4056; G01S 7/4802; G01S 7/539
USPC .............................. 342/22, 27, 85, 88, 90–91
See application file for complete search history.

(56) References Cited

U.S. PATENT DOCUMENTS

| 5,329,284 | A * | 7/1994 | Groenenboom et al. ..... 342/132 |
| 6,992,616 | B2 | 1/2006 | Grudkowski et al. |
| 7,050,787 | B2 * | 5/2006 | Caci ............................ 455/404.2 |
| 7,394,422 | B2 | 7/2008 | Nohmi |
| 7,663,502 | B2 * | 2/2010 | Breed .......................... 340/12.25 |
| 2003/0016157 | A1 * | 1/2003 | Fullerton et al. ................ 342/27 |
| 2008/0285631 | A1 * | 11/2008 | Shattil ........................... 375/148 |

FOREIGN PATENT DOCUMENTS

| EP | 0 611 969 A1 | 8/1994 |
| JP | 4-313091 | 11/1992 |
| WO | WO 2010/095946 A1 | 8/2010 |

OTHER PUBLICATIONS

Gordon J. Frazer et al., "Spatially Waveform Diverse Radar: Perspectives for High Frequency OTHR", 2007 IEEE, http://ieeexplore.ieee.org/xpl/freeabs_all.jsp?arnumber=4250341, Apr. 17-20, 2007, pp. 385-390.

Hammad A. Khan et al., "On the Merits of using Spatial and Waveform Diversity for Target Detection in Ultra Wideband Radars", http://ieeexplore.ieee.org/xpl/freeabs_all.jsp?arnumber=1605583, Oct. 6-7, 2005, 4 Pages.

(Continued)

*Primary Examiner* — John B Sotomayor
(74) *Attorney, Agent, or Firm* — Oblon, Spivak, McClelland, Maier & Neustadt, L.L.P.

(57) ABSTRACT

The present invention relates to an active radar system and a corresponding method. The proposed system comprises at least two transmit antennas that each transmits radiation to a scene as a transmit signal, said transmit signal comprising a series of frequency modulated pulses, at least one receive antenna that receives radiation from said scene as a receive signal, a controller that controls said at least two transmit antennas. The transmissions of the transmit signals are subsequently initiated with time offsets, controlled to be larger than the time delay between transmission of a first transmit signal of said two transmit signals and reception of radiation of said first transmit signal by said at least one receive antenna and to be smaller than the time duration of a complete frequency modulated pulse of said first transmit signal.

12 Claims, 5 Drawing Sheets

(56) References Cited

OTHER PUBLICATIONS

Reinhard Feger et al., "A 77-GHz FMCW MIMO Radar Based on an SiGe Single-Chip Transceiver", IEEE Tranactions on Microwave Theory and Techniques, http://ieeexplore.ieee.org/xpl/freeabs_all.jsp?arnumber=4814547, vol. 57, No. 5, May 2009, pp. 1020-1035.

Bhaskar D. Rao et al., "Multiple Antenna Enhancements Via Symbol Timing Relative Offsets (Maestro)", The 18th Annual IEEE International Symposium on Personal, Indoor and Mobile Radio Communications (PIMRC'07), 2007, http://sites.google.com/site/nandan/PIMRC2007-540.pdf, 5 Pages.

Joachim H. G. Ender, et al., "System Architectures and Algorithms for Radar Imaging by MIMO-SAR", IEEE Radar Conference 2009, pp. 1-6.

Jens Klare et al., "First Experimental Results with the Imaging MIMO Radar MIRA-CLE X", EUSAR Conference 2010, pp. 374-377.

Jens Klare, "Digital Beamforming for a 3D MIMO SAR—Improvements through Frequency and Waveform Diversity", IEEE Geoscience and Remote Sensing Symposium (IGARSS 2008), pp. V-17-V-18.

B. J. Donnet et al., "MIMO Radar—Waveforms and Applications", 4th EMRS DTC Technical Conference—Edinburgh 2007, 6 Pages.

B. J. Donnet et al., "MIMO Radar, Techniques and Opportunities", Proceedings of the 3rd European Radar Conference, Sep. 2006, pp. 112-115.

Jung-Hyo Kim et al., "Investigation of MIMO SAR for Interferometry", Proceedings of the 4th European Radar Conference, Oct. 2007, pp. 51-54.

Graham M. Brooker, "Understanding Millimetre Wave FMCW Radars", 1st international Conference on Sensing Technology, Nov. 21-23, 2005, pp. 152-157.

European Search Report issued Mar. 8, 2012 in Patent Application No. 11190472.8.

* cited by examiner

ACTIVE RADAR SYSTEM AND METHOD

CROSS-REFERENCE TO RELATED APPLICATIONS

The present application claims priority of European patent application 10194746.3 filed on Dec. 13, 2010.

FIELD OF THE INVENTION

The present invention relates to an active radar system and a corresponding active radar method.

BACKGROUND OF THE INVENTION

Active radar systems, in particular for use as active imaging systems, are becoming increasingly popular at ultrasonic, microwave, millimeter and terahertz frequencies for a number of applications including medical and security applications. Security active imaging systems for example enable suspicious items hidden under clothes or in bags to be visualised and to be easily identified. Medical active imaging systems on the other hand enable the visualisation of a huge variety of biological items.

There are various active radar systems and methods known using various means for separating the different transmitted signals, in particular for a MIMO (Multiple Input Multiple Output) Radar or MIMO Imaging system.

J. H. G. Ender, J. Klare, "System Architectures and Algorithms for Radar Imaging by MIMO-SAR", IEEE Radar Conference 2009 proposes two different methods. The first method time multiplexes the different transmitted signals to the different antennas, i.e. only one transmit antenna transmits a signal at one time. The second method transmits on all the transmitters at the same time, but each one transmits on a different band (which is a fraction of the overall system bandwidth). The mapping of bands to transmitter antennas may change from one time slot (or pulse duration) to the next.

J. Klare, O Saalmann, H. Wilden, "First Experimental Results with the imaging MIMO Radar MIRA-CLE X", EUSAR Conference 2010 proposes to multiplex the different transmitted signals to the different antennas, i.e. only one transmit antenna transmits a signal at one time.

J. Klare, "Digital Beamforming for a 3-D MIMO SAR—Improvements Through Frequency and Waveform Diversity", IEEE Geoscience and Remote Sensing Symposium (IGARSS 2008) proposes two different methods. The first method transmits on all of the transmitters at the same time, but each one uses a different band. The mapping of bands to transmit antennas changes from one time slot (pulse duration) to the next. The second method transmits on all of the transmit antennas at the same time but with Doppler tolerant orthogonal coded waveforms.

B. J. Donnet, I. D. Lonstraff, "MIMO Radar—Waveforms and applications". 4th EMRS DTC Technical Conference—Edinburgh 2007 describes a MIMO Radar system using OFDM (Orthogonal Frequency Division Multiplex) which uses Doppler tolerant Costas codes (and Golay codes) for determining the frequency hopping patterns of OFDM different transmitted waveforms.

B. J. Donnert et al, "MIMO Radar, Techniques and Opportunities", 3rd European Radar Conference proposes a MIMO system which uses OFDM and changes the frequencies on the different transmitted antennas in discrete steps. Different transmitters always send on different discrete frequencies.

J. H. Kim et al, "Investigation of MIMO SAR for Interferometry", Proceedings of 4th European Radar Conference proposes a MIMO system in which the different transmit signals are separated by using a space time block code (STBC).

G. Brooker, "Understanding Millimeter Wave FMCW Radars", 1st International Conference on Sensing Technology, Nov. 21-23, 2005, Palmerston North, New Zealand explains frequency modulated continuous wave (FMCW) radar systems. Such radars operate using the homodyne principle, i.e. a CW radar in which an oscillator serves as both the transmitter and local oscillator.

The above mentioned known systems have the drawbacks that they require much time since all transmit signal are to be transmitted subsequently one by one, require the use of special (complex, possibly non-optimal) codes, do no use the available bandwidth efficiently, are complex to implement, and/or require special (complex, expensive) hardware.

BRIEF SUMMARY OF THE INVENTION

It is an object of the present invention to provide an active radar system and a corresponding active radar method which overcome the above mentioned drawbacks, in particular require less time for signal transmission, reception and analysis, do not require the use of special codes or hardware for signal transmission and reception and can be easily implemented.

According to an aspect of the present invention there is provided an active radar system comprising at least two transmit antennas that each transmits radiation to a scene as a transmit signal, said transmit signal comprising a series of frequency modulated pulses, at least one receive antenna that receives radiation from said scene as a receive signal, a controller that controls said at least two transmit antennas such that the transmissions of the transmit signals of the various transmit antennas are subsequently initiated with time offsets, which time offset between two subsequently initiated transmissions of transmit signals is controlled to be larger than the time delay between transmission of a first transmit signal of said two transmit signals and reception of radiation of said first transmit signal by said at least one receive antenna and to be smaller than the time duration of a complete frequency modulated pulse of said first transmit signal, and a signal analyser that analyses said receive signal.

According to a further aspect of the present invention there is provided a corresponding active radar method comprising the steps of transmitting radiation to a scene as at least two transmit signals, each transmit signal comprising a series of frequency modulated pulses, receiving radiation from said scene as a receive signal, controlling the transmission of said at least two transmit signals such that the transmissions of the various transmit signals are subsequently initiated with time offsets, which time offset between two subsequently initiated transmissions of transmit signals is controlled to be larger than the time delay between transmission of a first transmit signal of said two transmit signals and reception of radiation of said first transmit signal and to be smaller than the time duration of a complete frequency modulated pulse of said first transmit signal, and analysing said receive signal.

Preferred embodiments of the invention are defined in the dependent claims. It shall be understood that the claimed active radar method has similar and/or identical preferred embodiments as the claimed active radar system and as defined in the dependent claims.

The present invention is based on the idea to transmit the transmit signals with a small time offset from each other, i.e. the transmit signal overlap in time. To ensure that the different transmit signal maintain their orthogonality, the time offset between two subsequently initiated transmissions of transmit signals is a) larger than the time delay between transmission of a first transmit signal of said two transmit signals and reception of radiation of said first transmit signal and b) smaller than the time duration of a complete frequency modulated pulse of said first transmit signal. Preferably, the time offset corresponds to a frequency offset which is set to be much greater than the total anticipated frequency difference between the transmit and receive signals due to distance (beat frequency) and movement (Doppler frequency).

By the proposed active radar system and method various advantages are achieved compared to the known systems and methods.

Known systems in which the transmit signals are time multiplexed require N pulse durations (where N is the number of transmit antennas) to send all of the transmit signals one at a time. The proposed active radar system requires a much shorter period of time to send all of the transmit signals since the transmit signals are sent with an overlap in time. This resulting speed increase means that objects can be scanned much more quickly with the proposed active radar system.

Known systems in which codes are used to distinguish the transmit signals need to find a suitable set of codes for the required number of transmit signals. Furthermore, MIMO systems using codes to distinguish the transmit signals do not have perfect orthogonally which leads to performance degradation. The proposed active radar system can, however, yield perfect orthogonally which provides an improved performance.

Known systems that use different bands to distinguish the transmit signals have a limited amount of bandwidth for each chirp duration (i.e. duration for a single transmit signal). Such systems have to use different multiple signal generators (also called chirp generators) to cover the different bands, which leads disadvantageously to higher complexity. The proposed active radar system does not have these disadvantages.

Known systems which use OFDM with stepped frequency continuous waves require a wideband IFFT (Inverse Fast Fourier Transform) to be implemented. Typically, MIMO radar systems would have transmission bandwidths of several GHz, and to implement this with OFDM (using IFFT) is very difficult. The proposed active radar system does not have these disadvantages.

Known systems which use STBC (Space Time Block Codes) to separate the transmit signals are only available for certain numbers of transmit antennas (i.e. 2, 4, 8 etc.) which can restrict the design of a MIMO radar (imaging) system, since only certain numbers of transmit antennas can be used. The proposed active radar system does not have these disadvantages.

The proposed active radar system and method can, for instance, advantageously be used for a MIMO radar system or MIMO imaging system, in particular using FMCW, whereby the (preferably all) transmit signals are orthogonal to each other (hence yielding optimum performance) and which does not require a transmission time consisting of multiple pulse durations. Furthermore, the proposed active radar system and method do not require the use of special codes. The proposed active radar system and method are especially (but not exclusively) applicable for short distance (and/or indoor applications) where the distance between the transmit antennas and the objects to be viewed (or imaged) is relatively short, for instance below 10 m.

It should be noted that in practice an active radar system will comprise two or more transmit antennas and two or more receive antennas. While it is general sufficient that the time offset between two subsequently initiated transmissions of transmit signals is larger than the time delay between transmission of a first transmit signal of the two or more transmit signals and reception of radiation of said first transmit signal by at least one receive antenna, it is preferred that the time offset between two subsequently initiated transmissions of transmit signals is larger than the time delay between transmission of a first transmit signal of the two or more transmit signals and reception of radiation of said first transmit signal by all receive antennas. This ensures that the transmitted signals are received generally at the same time at all receive antennas.

In an aspect of the present invention an active radar system is presented comprising:

at least two transmission means for each transmitting radiation to a scene as a transmit signal, said transmit signal comprising a series of frequency modulated pulses, at least one receiving means for receiving radiation from said scene as a receive signal, a control means for controlling said at least two transmission means such that the transmissions of the transmit signals of the various transmission means are subsequently initiated with time offsets, which time offset between two subsequently initiated transmissions of transmit signals is controlled to be larger than the time delay between transmission of a first transmit signal of said two transmit signals and reception of radiation of said first transmit signal by said at least one receiving means and to be smaller than the time duration of a complete frequency modulated pulse of said first transmit signal, and a signal analysis means for analysing said receive signal.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

The arrangement of transmitter and receiver in an active radar system, e.g. in an active imaging system, may take on many different forms. For the following explanation active radar systems will be considered in which multiple transmitters (transmit antennas) and receivers (receive antennas) work together to form a MIMO radar or MIMO active imaging system (which shall be understood as being covered by the general expression "active radar system"). The invention is, however, not limited to those MIMO radars or MIMO active imaging systems, but can also be applied in active radar systems having only a single receive antenna and only two transmit antennas.

Figure 1:
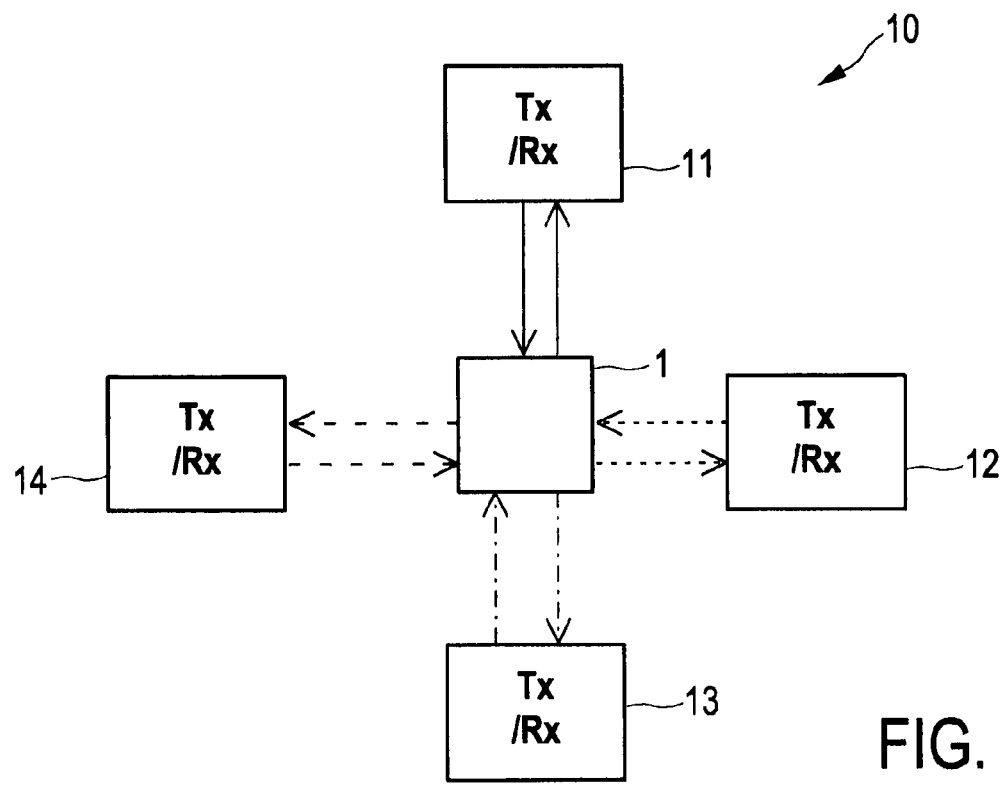
FIG. 1 shows a schematic diagram of a known statistical MIMO radar.

There are predominately two different types of MIMO radar. The first type is called statistical MIMO, in which system the antennas are placed far apart from each other and typically consist of multiple radars (also called radar units) to provide different views of the object. By doing this the MIMO radar provides robustness for the signal against fading, since the total receive signal is a superposition of all of the different receive signals. An example of the general layout of a statistical MIMO radar 10 having four radar units 11, 12, 13, 14 each comprising a transmit antenna (indicated by Tx) and a receive antenna (Rx) or a common transmit/receive antenna and providing four different views of an object 1 is shown in FIG. 1.

Figure 2:
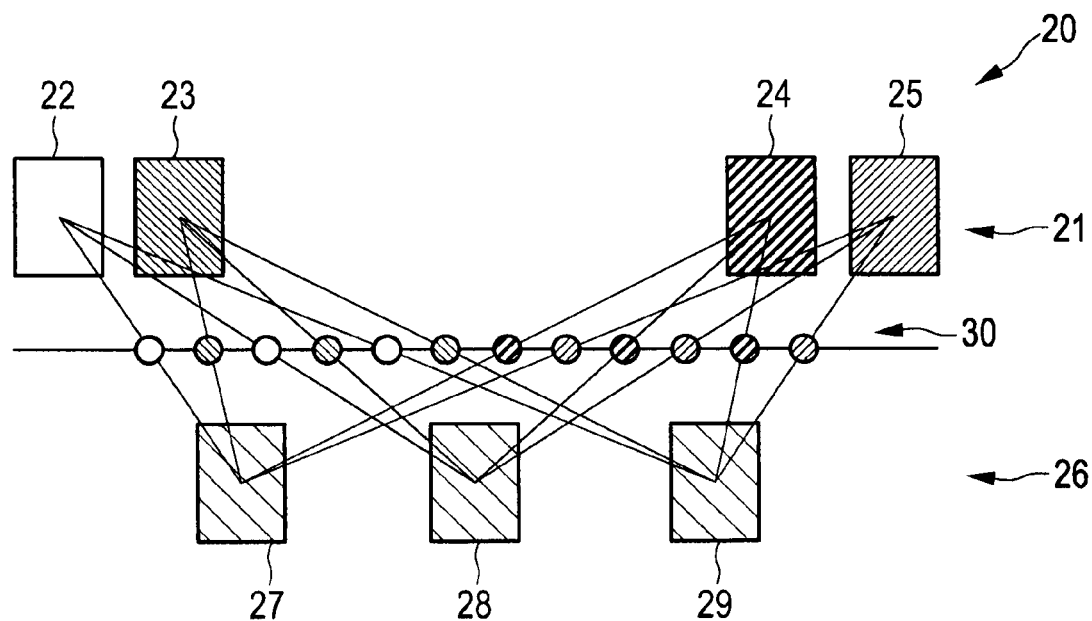
FIG. 2 shows a schematic diagram of a known co-located MIMO radar.

The second type of MIMO radar is called co-located MIMO (or beam forming MIMO) radar. In this system the antennas are placed close to each other and act together to form a 'virtual' beam forming array. A general layout of such a co-located MIMO radar 20 is shown in FIG. 2. Said radar 20 comprises a transmit antenna array 21 comprising a number (here four) transmit antennas 22, 23, 24, 25 and a receive antenna array 26 comprising a number (here three) receive antennas 27, 28, 29. Since the antenna gain of any array is directly proportional to the number of antenna elements, the advantage of such an arrangement (when it is optimally designed) is that the number of elements in the virtual array 30 (indicated by the circles) is $N_T \times N_R$ (where $N_T$ is the number of transmit antennas and $N_R$ is the number of receive antennas) but the number of transmit antennas and receive antennas is only $N_T + N_R$. For the example, as shown in FIG. 2, the number of virtual elements is twelve, but only four transmitters and three receivers would be needed. For a traditional array, twelve receivers would be needed to form such a twelve element array.

It shall be noted here, that the proposed invention can be applied to both statistical MIMO and to co-located MIMO.

The basic challenge with MIMO active radar systems, e.g. MIMO active imaging systems is how the receiver can distinguish between the $N_T$ transmit signals. In a preferred embodiment the present invention uses frequency modulated continuous wave (FMCW) which shall be generally explained first.

Figure 3A:
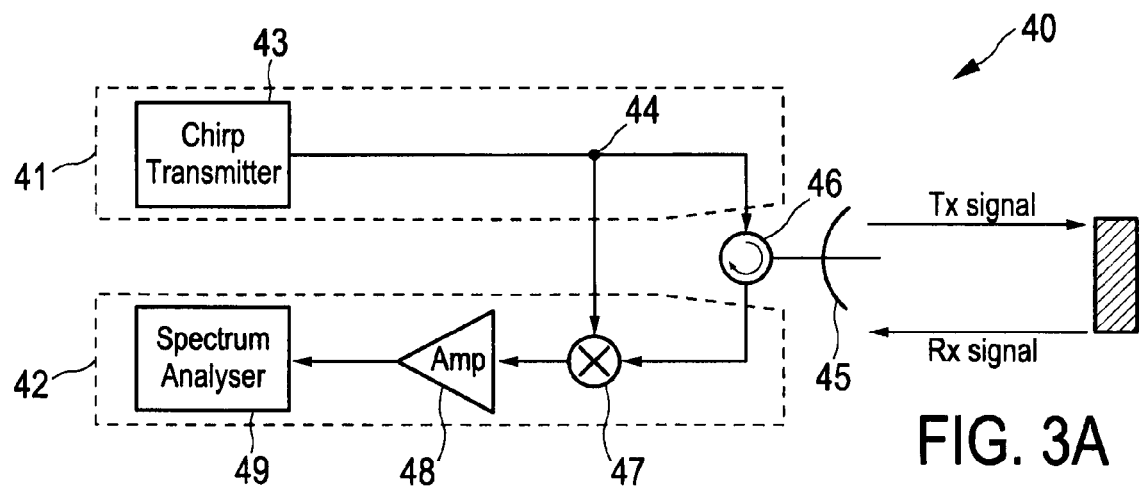
FIG. 3 shows a schematic diagram of an FMCW radar and exemplary waveforms used therein.

A thorough explanation of FMCW is given in G. Brooker, "Understanding Millimeter Wave FMCW Radars", 1st International Conference on Sensing Technology, Nov. 21-23, 2005, Palmerston North, New Zealand. An example of a known embodiment of a FMCW radar 40 comprising a transmitter part 41 and a receiver part 42 is shown in FIG. 3A. A chirp transmitter 43 of the transmitter part 41 transmits a continuous wave signal that is frequency modulated (frequency is changing with time) to produce a chirp signal. This is transmitted to the object 1 to be examined by an antenna 45 and is also fed to the receiver part 42 via a coupler 44. The transmit signal will be reflected by the object 1 (the level of the reflection will depend upon the properties of the object 1), received by the antenna 45 and coupled to the receiver part 42 by a duplexer 46. Since the transmitted chirp pulse is changing its frequency with time, the exact frequency received for a given time instant depends upon how far away the object 1 is located and the corresponding flight time ($T_p$). This received signal is then mixed in mixer 47 with the transmitted chirp (via the coupler 44) and the output of the mixer 47 is amplified in an amplifier 48 and analysed in a spectrum analyser 49. The output signal of the mixer 47 has a frequency which is the difference in frequency between the transmitted signal and the received signal. This is known as the beat frequency ($f_b$) and is directly proportional to the distance between the FMCW radar and the object.

Figure 3B:
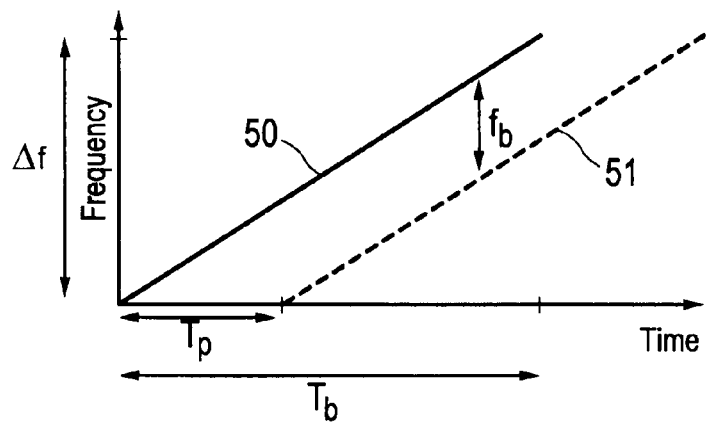

The frequency variation against time of the transmitter signal (chirp pulse) 50 and the received signal 51 is shown in the diagram depicted in FIG. 3B. The difference in frequency between the transmitted signal 50 and the received signal 51, i.e. the beat frequency $f_b$, is also labelled. Further, $T_p$ indicated the flight time, $T_b$ indicates the chirp pulse duration, and $\Delta f$ indicates the chirp pulse bandwidth.

Figure 4:
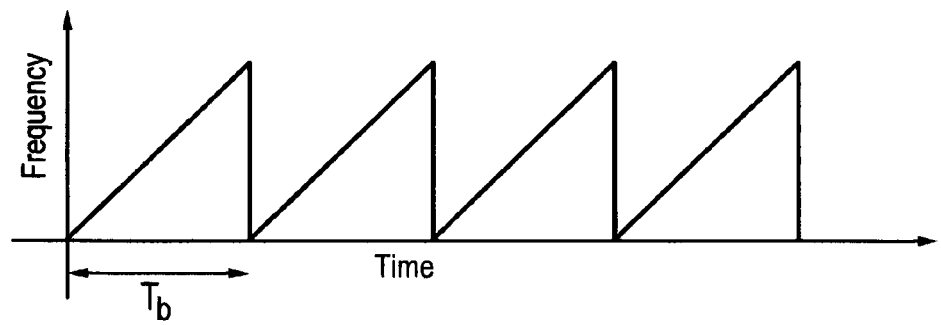
FIG. 4 shows a diagram illustrating a standard frequency ramp as used in FMCW.

A typical FMCW radar system would typically send chirp pulses continuously. A typical variation of frequency with time of such chirp pulses having a typical ramp waveform is shown in the diagram of FIG. 4.

Figure 5:
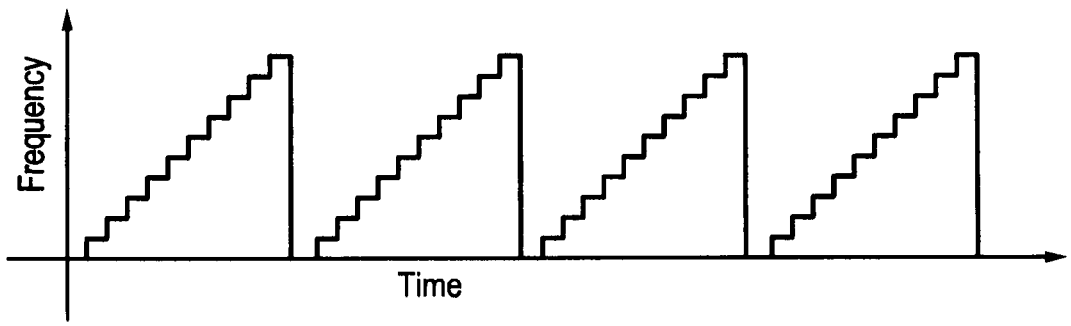
FIG. 5 shows a diagram illustrating a frequency ramp as used in SFCW.

A commonly used alternative to FMCW is stepped frequency continuous wave (SFCW), in which the frequency does not change in a continuous way, but in a stepped way, such that the frequency remains constant for a period of time at each step. An example of this is shown in the diagram of FIG. 5. SFCW may be used in radar systems which use OFDM, and the frequency steps typically correspond to the OFDM sub-carrier spacing.

Figure 6:
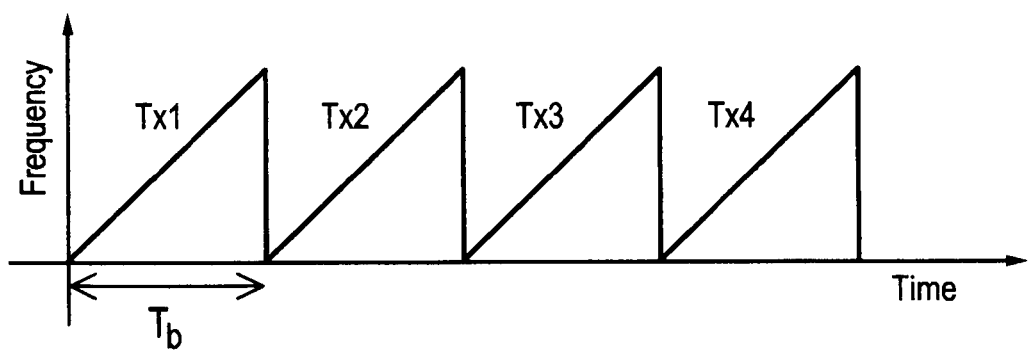
FIG. 6 shows a diagram illustrating time division multiplexed MIMO transmission for FMCW.

The basic challenge with MIMO active imaging systems or MIMO radar systems, generally for active radar systems having more than one transmit antenna, is how the receiver can distinguish between the $N_T$ transmit signals. As explained above, some known approaches propose to separate the $N_T$ transmit signals in time (called "time multiplexing") which requires sending the $N_T$ pulses one at a time and disadvantageous requires an illumination time which is $N_T$ times longer than normal (i.e. for sending only a single transmit signal). An example of the frequency ramp for such a system using FMCW with four transmit antennas Tx1-Tx4 is shown in FIG. 6.

Figure 7:
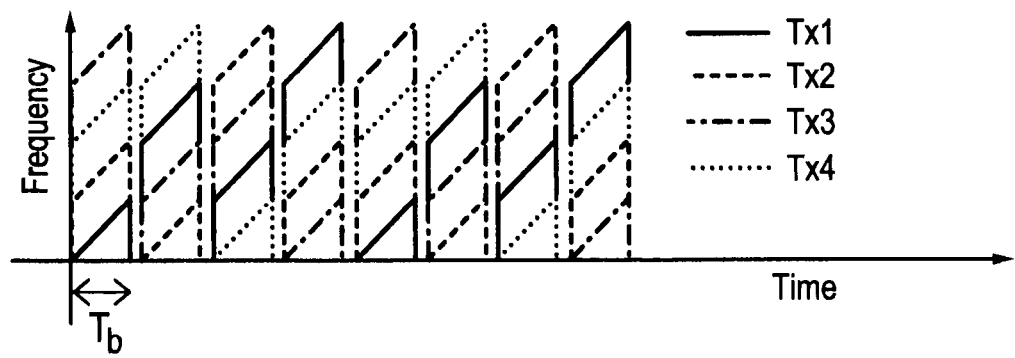
FIG. 7 shows a diagram illustrating band division multiplexed MIMO transmission for FMCW.

Another known approach is to split the transmission bandwidth into $N_T$ partial bands, and each transmitter sends one band at one time. An example of the frequency use by such a system with four transmit antennas Tx1-Tx4 is shown in FIG. 7. Such systems, however, have a limited amount of bandwidth for each sent pulse which in turn means that the resulting range resolution for each pulse is reduced. Furthermore, systems with multiple bands have to use different multiple chirp generators which leads disadvantageously to higher complexity.

A further known approach consists in applying frequency multiplexing to SFCW and has been proposed for OFDM systems with SFCW. The approach is to separate the SFCW waveforms by some frequency steps, so that the two different transmitters are not using the same subcarrier frequencies at the same time.

Figure 8:
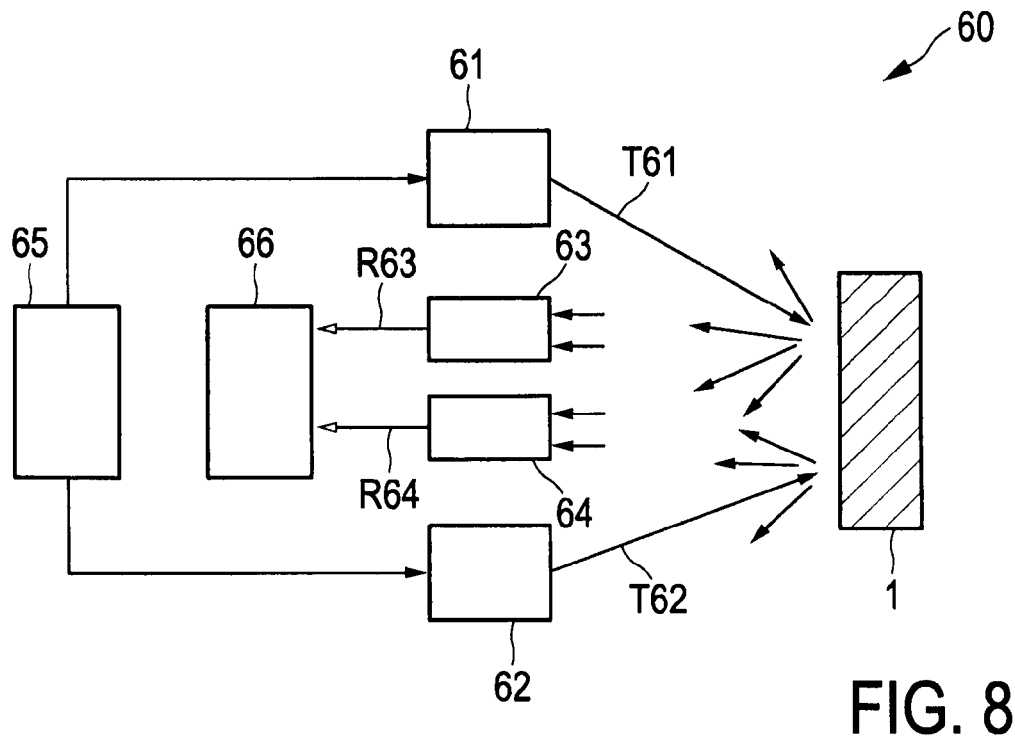
FIG. 8 shows an embodiment of an active radar system according to the present invention.

An embodiment of an active radar system 60 according to the present invention is shown in FIG. 8. Generally it comprises at least two transmit antennas, in this embodiment two transmit antennas 61, 62, that each transmits radiation to a scene (e.g. an object 1) as a respective transmit signal T61, T62. Said transmit signals T61, T62 generally each comprises a series of frequency modulated pulses as will be explained below.

The active radar system 60 generally further comprises at least one receive antenna, in this embodiment two receive antennas 63, 64, that each receives radiation from said scene as a respective receive signal R63, R64. Said radiation of the receive signals R63, R64 mainly includes radiation that has been transmitted to the scene from the transmit antennas 61, 62 and that has been reflected by said scene (e.g. the object 1).

Figure 9:
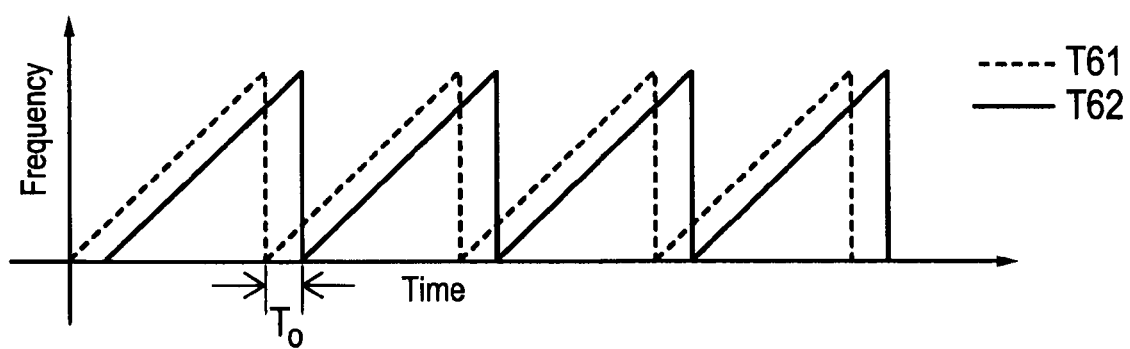
FIG. 9 shows a diagram illustrating time offset MIMO transmission as proposed according to the present invention.

Further, a controller 65 is provided that controls said transmit antennas 61, 62 such that the transmissions of the transmit signals of the various transmit antennas 61, 62 are subsequently initiated with time offsets as depicted in the diagram of FIG. 9 showing two subsequently transmitted transmit signals T61 and T62 of transmit antennas 61 and 62. Finally, a signal analyser 66 is provided that analyses said receive signals R63, R64 of the two receive antennas 63, 64.

Figure 10:
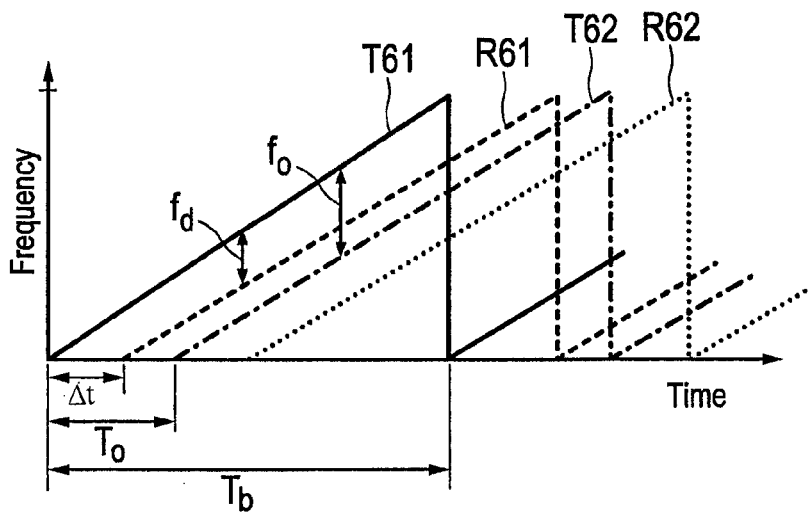
FIG. 10 shows a diagram illustrating more details of time offset MIMO transmission as proposed according to the present invention.

As mentioned, instead of time multiplexing the sent pulses of the transmit signals (as shown in FIG. 6), according to the present invention the pulses of the transmit signals T61, T62 are sent with a small time offset $T_o$ from each other and therefore overlap in time as shown in the example depicted in FIG. 9. FIG. 10 depicts the two transmit signals T61, T62 and the corresponding two receive signal portions R61, R62 (received with a slight time delay by the two receive antennas). It should be noted that both receive signal portion R61, R62 are received by both receive antennas 63, 64 and are thus both included in their receive signals R63, R64. The time offset $T_o$ between the two subsequently initiated transmissions of transmit signals T61, T62 is controlled to be larger than the time delay $\Delta t$ between transmission of the first transmit signal T61 and reception of radiation of said first transmit signal, i.e. reception of the first receive signal portion R61, by at least one of said two receive antennas 63, 64, preferably by both receive antennas, or—in case of multiple receive antennas—preferably all receive antennas. Further, the time offset $T_o$ is controlled to be smaller than the time duration $T_b$ of a complete frequency modulated pulse of said first transmit signal T61. This provides that the orthogonality of the transmit signals is maintained, thus enabling that the different receive signals resulting from the different transmit signals can be distinguished despite the overlap in time during reception.

The active radar system and method of the present invention are preferably suitable for short range systems. In a preferred embodiment FMCW is used. Further, in an embodiment the same transmit signals (same pulses) and the same bandwidth is used for each of the transmit antennas. However, in other embodiments, each transmit antenna or each group of transmit antennas transmits a different transmit signal, in particular comprising pulses covering a different bandwidth and/or being differently frequency modulated, which further helps to distinguish the different receive signals.

The above describe time offset $T_o$ between the sent transmit signals effectively corresponds to a frequency offset $f_o$ which is set to be (much) greater than the total anticipated frequency difference $f_d$ between the transmit signals (e.g. transmit signal T61) and receive signals (e.g. receive signal R61) due to distance (beat frequency) and any movement (Doppler frequency). In other words, the time offset between two subsequently initiated transmissions of transmit signals preferably corresponds to a frequency offset $f_o$, which frequency offset is controlled to be larger than the frequency difference $f_d$ between a first transmit signal T61 and reception of radiation of said first transmit signal by at least one receive antenna 63, 64 due to the length of the signal path from said first transmit antenna 61 to said at least one receive antenna 63, 64 and any movement of the object 1 reflecting said first transmit signal T61.

The system and method of the present invention are therefore particularly suitable for short distance indoor MIMO systems where the distances between the radar and object are relatively short, e.g. up to 10 m, thereby creating a low beat frequency, and whereby the object may be stationery or moving at low velocities, thereby only causing low Doppler frequencies to be generated. Further, the system and method of the present invention can be used for longer range systems in which the range of objects' distances is limited so as not to cause any confusion (or ambiguities) of the different receive signals from the different transmit signals.

In an embodiment a fixed time delay $\Delta t$ is used between transmission of a first transmit signal T61 and reception of radiation of said first transmit signal T61 by said at least one receive antenna 63, 64 for the control of the time offset $T_o$. This fixed time delay can be obtained in advance, e.g. by a calibration measurement, or can be calculated based on known distances between the antennas and the object.

In another embodiment at least one transmit antenna transmits, in particular all transmit antennas subsequently transmit, a transmit signal, e.g. a test transmit signal. The signal analyser 66 then analyses the receive signal to determine the time delay $\Delta t$ between transmission of the transmit signal and reception of radiation of said transmit signal.

In another embodiment a fixed time offset $T_o$ is used for controlling the transmission of two subsequently initiated transmissions of transmit signals. Said fixed time offset $T_o$ is generally determined in advance, e.g. by experiments or calculations. Preferably, an identical fixed time offset is for controlling all transmission of two subsequently initiated transmissions of transmit signals.

In an alternative embodiment the time offset for controlling the transmission of two subsequently initiated transmissions of transmit signals is varied or can be variable, e.g. to adapt the time offset depending on modified distances between the antennas and the object.

While the above embodiments use two transmit antennas and two receive antennas, other numbers of antennas can also be used. Thus, generally, the system comprises a plurality of transmit antennas and a plurality of receive antennas (wherein the numbers may be equal or different). Further, the invention may be used in different configurations (as generally shown in FIGS. 1 and 2). For instance, the invention may be used in a statistical MIMO configuration comprising antenna pairs, each antenna pair comprising a transmit antenna and a receive antenna, said antenna pairs being arranged distant from each other, in particular at different directions from an object or a scene to be illuminated. Further, the invention may be used in a co-located MIMO configuration in which the transmit antennas are arranged close to each other forming a transmit antenna array and the receive antennas are arranged close to each other forming a receive antenna array.

For analysis of the receive signals, in particular for distinguishing the different receive signals despite their overlap in time, various measures can be taken. In an embodiment the signal analyser 66 comprises two or more mixers, in particular a mixer per transmit signal that is at least partly transmitted simultaneously or a mixer per transmit antenna, wherein a mixer is operable to mix the receive signal with the respective transmit signal to obtain a mixer output signal per mixer and a filter per mixer that filters the respective mixer output signal to obtain the contribution of the receive signal resulting from the respective transmit signal.

Figure 11:
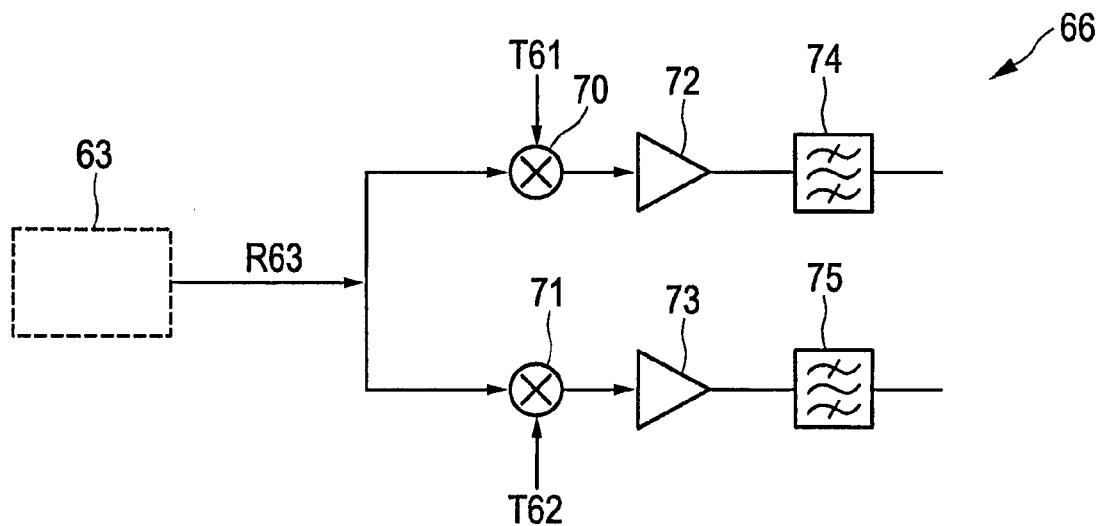
FIG. 11 shows an embodiment of a frequency analyser according to the present invention.

An exemplary embodiment of a signal analyser 66 for use in the embodiment of the active radar system 60 shown in FIG. 8 is schematically depicted (for the output path of the receive antenna 63) in FIG. 11. It comprises two mixers 70, 71 in which the receive signal R63 (which effectively comprises the time-shifted receive signals R61, R62) are mixed with the transmit signals T61 and T62, respectively. The output signals of the mixers 70, 71 are amplified by amplifiers 72, 73 and then filtered by filters 74, 75 to filter out unwanted components. For instance, in the upper path only the components resulting from the receive signal R61 pass the filter 74, and in the lower path only the components resulting from the receive signal R62 pass the filter 75.

Compared to the known systems the main advantages of the proposed active radar system and method are:
a) When compared to systems in which the transmitted signals are time multiplexed the different transmit signals in the proposed approach can be transmitted much quicker since the transmit signals (e.g. each forming a FMCW ramp) overlap in time. This resulting speed increase means that the objects can be scanned much more quickly.
b) When compared to systems in which codes are used to distinguish the transmitted signals codes do not need to be found according to the proposed approach for the required number of transmit signals. Furthermore, MIMO systems using codes to distinguish the transmitted signals do not have perfect orthogonality which leads to performance degradation. The proposed approach can, however, yield perfect orthogonality which leads to improved performance.
c) When compared to systems in which different bands are used to distinguish the transmitted signals the proposed approach provides more bandwidth for each transmit signal (e.g. chirp pulse). Furthermore, the multiband approach has to use different multiple chirp generators which lead disadvantageously to higher complexity.
d) When compared to systems in which OFDM is used with stepped frequency continuous wave, the proposed approach does not require a wideband IFFT (Inverse Fast Fourier Transform) to be implemented. Typically, MIMO radar systems would have transmission bandwidths of several GHz and to implement this with OFDM (using IFFT) would be very difficult.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An active radar system, comprising:
at least two transmit antennas configured to transmit radiation to a scene as at least a first transmit signal and at least a second transmit signal, respectively, each transmit signal comprising a series of frequency modulated pulses;
at least one receive antenna configured to receive radiation from said scene as at least one receive signal;
a controller configured to control at least one of said at least two transmit antennas such that a first transmission of the at least first transmit signal and the at least second transmit signal is initiated with a time offset, such that the time offset is controlled to be larger than a time delay between the transmission of the at least first transmit signal and reception of radiation of said at least first transmit signal received by said at least one receive antenna, and to be smaller than a time duration of a complete frequency modulated pulse of said at least first transmit signal; and
signal analyser configured to analyse said at least one receive signal to determine the time delay,
wherein said controller is further configured to control the time offset for at least a subsequently initiated transmission of said at least first transmit signal and said at least second transmit signal based on the determined time delay.

2. The active radar system as claimed in claim 1, wherein said at least two transmit antennas are configured to each transmit identical transmit signals.

3. The active radar system as claimed in claim 1, wherein said at least two transmit antennas are configured to each transmit a different transmit signal, in particular comprising pulses covering a different bandwidth and/or having a different frequency modulation.

4. The active radar system as claimed in claim 1, wherein said controller is configured to control the time offset for the at least subsequently initiated transmission of said at least first transmit signal and said at least second transmit signal to correspond to a frequency offset, such that the frequency offset is controlled to be larger than a frequency difference between a first frequency of said at least first transmit signal and a second frequency of radiation of said at least first transmit signal received by said at least one receive antenna, due to a length of a signal path from said at least one of said at least two transmit antennas to said at least one receive antenna and any movement of said scene reflecting said at least first transmit signal.

5. The active radar system as claimed in claim 1, wherein said controller is configured to control the time offset using a fixed time delay between the transmission of the at least first transmit signal and reception of radiation of said at least first transmit signal received by said at least one receive antenna.

6. The active radar system as claimed in claim 1, wherein said controller is configured to vary the time offset for at least the subsequently initiated transmission of said at least first transmit signal and said at least second transmit signal.

7. The active radar system as claimed in claim 1, wherein the at least one receive antenna comprises at least two receive antennas configured to receive radiation from said scene as at least a first receive signal and at least a second receive signal, respectively, wherein said controller is further configured to control the time offset to be larger than a time delay between the transmission of the at least first transmit signal and reception of the at least first receive signal by the at least two receive antennas.

8. The active radar system as claimed in claim 7, wherein a plurality of the at least two transmit antennas are configured to communicate with a corresponding plurality of receive antennas of the at least two receive antennas.

9. The active radar system as claimed in claim 8, wherein each antenna pair in said plurality and said corresponding plurality comprises a transmit antenna and a receive antenna, and are arranged distant from each other in different directions from said scene.

10. The active radar system as claimed in claim 8, wherein the plurality of the at least two transmit antennas are arranged close to each other forming a transmit antenna array, and the corresponding plurality of receive antennas are arranged close to each other forming a receive antenna array.

11. The active radar system as claimed in claim 1,
wherein said analyser comprises a plurality of mixers, including a mixer per transmit signal that is at least partly transmitted simultaneously, or a mixer per transmit antenna, and
wherein each mixer of the plurality of mixers is configured to mix the at least one receive signal with its respective transmit signal to obtain a mixer output signal per mixer and a filter per mixer that filters the respective mixer output signal to obtain a contribution of the at least one receive signal resulting from its respective transmit signal.

12. An active radar method, comprising:
transmitting radiation to a scene as at least a first transmit signal and at least a second transmit signal, respectively, each transmit signal comprising a series of frequency modulated pulses;
receiving radiation from said scene as at least one receive signal;
controlling the transmission such that a first transmission of said at least first transmit signal and said at least second transmit signal is initiated with a time offset, such that the time offset is controlled to be larger than a time delay between the transmission of the at least first transmit signal and reception of radiation of said at least first transmit signal, and to be smaller than a time duration of a complete frequency modulated pulse of said at least first transmit signal; and
analysing said receive signal to determine the time delay, wherein controlling includes controlling the time offset for at least a subsequently initiated transmission of said at least first transmit signal and said at least second transmit signal based on the determined time delay.

* * * * *